United States Patent Office 3,526,652
Patented Sept. 1, 1970

3,526,652
POLYISOCYANATES-WATER REACTION PRODUCTS
Eugene L. Powers, New Martinsville, W. Va., assignor to Mobay Chemical Company, Pittsburgh, Pa., a corporation of Delaware
No Drawing. Filed Aug. 5, 1966, Ser. No. 570,416
Int. Cl. C07c *119/04;* C08g *22/44*
U.S. Cl. 260—453          2 Claims

ABSTRACT OF THE DISCLOSURE

Organic polyisocyanates are prepared by a process wherein a mixture of polyaryl polyalkylene polyisocyanates is reacted with about 0.1% to about 0.5% of water based on the weight of the mixture of isocyanates whereby the water selectively reacts with the higher functional isocyanates so that the resulting product will not have the diisocyanate content reduced by more than about 2%.

---

This invention relates to organic polyisocyanates, and more particularly to polymeric isocyanates which contain urea-biuret groupings and to a process for the preparation of such polyisocyanates.

It has been proposed heretofore to prepare biuret polyisocyanates by reaction of a small amount of water with an organic diisocyanate. Accordingly, it would be expected that if a mixture of di- and higher polyisocyanates was reacted with a small amount of water that one would make a mixture of biuret polyisocyanates, part of which was based on the diisocyanate and part of which was based on the higher polyisocyanates. It would be advantageous, however, if this were not so. It would be particularly advantageous if the diisocyanate content remained practically the same and the higher polyisocyanate reacted preferentially with the water. The resulting product would then have a very desirable ratio of diisocyanate to higher polyisocyanates because of linking of the higher polyisocyanates together with a urea biuret structure.

The mixtures of diisocyanates and the higher polyisocyanates are not only useful as an adhesive but they are also especially useful for the preparation of polyurethane foams which have improved resistance to burning. It is not exactly understood why the products based partially on a diisocyanate and partially on tetra- and higher functional isocyanates result in polyurethane adhesives which have improved adhesion and heat resistance.

It is, therefore, an object of this invention to provide isocyanates containing a urea-biuret linkage which have the improved properties set forth above. Another object of this invention is to provide an improved process for the preparation of mixtures of isocyanates containing predominantly diisocyanates and predominantly higher functional isocyanates in the mixture. Another object of this invention is to provide improved polyurethanes, including foams based on the isocyanates and improved adhesives based on the isocyanates.

The foregoing objects and others which will become apparent from the following description are accomplished in accordance with the invention, generally speaking, by providing urea-biuret polyisocyanates prepared by reacting a mixture of organic isocyanates having the formula:

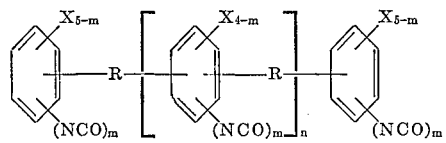

wherein $n$ is an integer of 0, 1, 2 or 3 so that about 20 to 90 percent diisocyanate is present in the initial mixture with from about 0.1 percent to about 0.5 percent by weight of water based on the weight of the mixture of isocyanates at a temperature of about 100 to about 140° C. for from about 1 to about 5 hours. The resulting product will not have the diisocyanate content reduced by more than about 2 percent and will have its triisocyanate content primarily reduced so that most of the product having a functionality greater than two is tetra- and higher functional isocyanates. It may be necessary in some instances to filter the resulting product in order to remove the solids.

Any suitable mixture having the general formula set forth above where $n$ is an integer sufficient to give a mixture preferably containing about 30 to 80 percent diisocyanate may be used. Suitable polyisocyanates of this type are, for example, the polyphenyl polymethylene polyisocyanates and other similar polyaryl polyalkylene polyisocyanates prepared by the phosgenation of a reaction product of an aromatic primary amine with an aldehyde or ketone such as formaldehyde or methyl ethyl ketone. Suitable compounds of this type are disclosed in U.S. Pats. 2,683,730 and 2,760,953, in British Pat. 874,430 and Canadian Pat. 665,495. A particularly advantageous mixture of polyphenyl polymethylene polyisocyanates is prepared by phosgenating the reaction product of aniline with formaldehyde. This product is preferably prepared by first condensing aniline with formaldehyde under acid conditions and in such proportions that from about 40 to about 65 percent of the resulting mixture of polyphenyl methylene polyamines is a diphenyl methane diamine such as 4,4'-diphenyl methane diamine and the balance of the reaction mixture includes various corresponding triamines, tetra-amines and the like. This mixture of amines when phosgenated will produce an isocyanate which could be represented by the general formula:

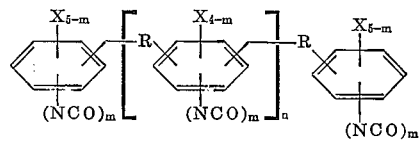

in which R is an organic radical and preferably an aliphatic radical obtained by removing the carbonyl oxygen from an aldehyde or ketone and is preferably —$CH_2$—, $m$ is 1 or 2, X is halogen, lower alkyl or hydrogen and $n$ is 0, 1, 2 or 3. The aliphatic radical, R in the foregoing formula may be obtained by removing the carbonyl oxygen from formaldehyde or any suitable ketone such as acetone, methyl ethyl ketone, methyl-n-propyl ketone, diethyl ketone, hexanon-2, hexanon-3, di-n-propyl ketone, di-n-heptyl ketone, benzophenone, dibenzyl ketone, cyclohexanone and the like. To illustrate, if one removes the carbonyl oxygen from formaldehyde, $H_2C=O$, the radical remaining is a methylene radical or from acetone, $CH_3$—CO—$CH_3$, the radical remaining is

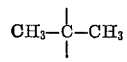

When X is halogen, it may be any suitable halogen but is preferably chlorine or bromine and further, it is preferred that the amount of chlorine or bromine fall between about 1 percent and 40 percent by weight of the compound. When X is lower alkyl, it is most preferably methyl or ethyl but other lower alkyl radicals such as propyl, butyl and the like may be the radical, X. The polyaryl alkylene polyisocyanates are preferably mixtures of di- and high polyisocyanates. Thus, $n$ in the formula preferably has an average value of from about 0.1 to about 1.5. To illustrate, in a mixture of isocyanates of the above formula containing 90 percent diisocyanate and 10 percent triisocyanate, $n$ would have a value of 0.1. For a mixture containing 20 percent di-, 30 percent tri-, 30 percent tetra- and 20 percent penta-isocyanate, the average value of $n$ would be 1.5. A most preferred value for $n$ is between about 0.85 and about 1.1 with about 40 percent to about 60 percent of the mixture of polyisocyanates being a diisocyanate.

Isocyanates of the above formula are well-known and available commercially. They may be prepared as disclosed in U.S. Pat. 2,683,730. A specific isocyanate suitable for use in accordance with the present invention may be obtained by reacting about 60 parts of aniline with about 25 parts of formaldehyde (aqueous, 37 percent $CH_2O$) and about 74 parts of HCl (aqueous, 30 percent HCl) at a temperature of about 90° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed.

The commercially available polyphenyl methane polyisocyanates are particularly adapted for use in the present invention. The best products have 40 percent to 60 percent 4,4'-diphenyl methane diisocyanate, an amine equivalent of about 125 to about 140, about 0.04 to about 0.4 percent by weight hydrolyzable chloride, about 0.1 to about 0.6 percent by weight total chloride and have a flash point of above about 400° F.

As pointed out above, the organic polyisocyanates which have been reacted with 0.1 to 0.5 percent by weight of water are particularly useful for the preparation of cellular polyurethane plastics as well as adhesives. The cellular polyurethane plastics have improved resistance to burning. The cellular polyurethane plastics are prepared by reaction of a mixture of aromatic polyisocyanates with an organic compound containing active hydrogen containing groups in the presence of a blowing agent. Suitable processes for the preparation of cellular polyurethane plastics are disclosed in U.S. Reissue Pat. 24,514 together with suitable machinery to be used therefore. When water is added as a blowing agent corresponding quantities of excess of the mixture or aromatic polyisocyanates to react with the water and produce carbon dioxide are used over the quantity of the mixture of aromatic polyisocyanates required to react with the active hydrogen containing compound. It is preferred, however, in the preparation of rigid cellular polyurethane plastics to employ a blowing agent which is a halogenated hydrocarbon such as dichloro difluoro methane, trichlorofluoro methane, dichlorofluoro methane, methylene chloride, 2-chloropropane or the like. In addition, however, even though water is not used as the blowing agent low boiling hydrocarbons such as pentane, hexane, heptane, pentene, heptene and the like or azo compounds such as azohexahydrobenzo dinitrile and the like may be used. The polyurethane foams of the invention may be prepared either by reacting all of the components in a single mixing step or it is possible to prepare a prepolymer from some or all of the organic polyisocyanate and the organic compound containing active hydrogen containing groups in a first step and then react the prepolymer in a second step with water or another nonreactive blowing agent and additional amount of a mixture of aromatic polyisocyanates in order to prepare the cellular polyurethane plastics of the invention.

Any suitable organic compound containing at least two active hydrogen containing groups as determined by the Zerewitinoff method may be used. Generally speaking, any compound having an active hydrogen atom as defined above which will react with an —NCO group may be used. Hydroxyl groups react with —NCO groups to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used, active hydrogen containing compounds are contemplated which may contain any of the following types of active hydrogen containing groups, among others, —OH, —NH$_2$,

—NH—

—COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-identified classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid number, where applicable, below about 5. A satisfactory upper limit for the molecular weight of the organic compound containing at least two active hydrogen containing groups is about 10,000 but this limitation may vary so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, isophthalic acid, terephthalic acid, hemimelitic acid, trimellitic acid, trimesic acid, mellophanic acid, prehinitic acid, pyromellitic acid, benzene-pentacarboxylic acid, 1,4-cyclohexanedicarboxylic acid, 3,4,9,10-perylene-tetracarboxylic acid and the like. Any suitable polyhydric alcohol may be used such as, for example, ethylene glycol, 1,3-propylene glycol, 1,2-butylene, glycol, 1,2-propylene glycol, 1,4-butylene glycol, 1,3-butylene glycol 1,5-pentane diol, 1,4-pentane diol, 1,3-pentane diol, 1,6-hexane diol, 1,7-heptane diol, glycerine, trimethylolpropane, 1,3,6-hexane triol, triethanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having a relatively high molecular weight including other active hydrogen containing compounds as disclosed herein. It is preferred that the initiator have from 2 to 8 active sites to which the alkylene oxides may add, including for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups. It is preferred to use alkylene oxides which contain from 2 to 5 carbon atoms and, generally speaking, it is advantageous to condense from about 5 to about 30 mols of the alkylene oxide per functional group of the initiator. There are many desirable processes for the preparation of polyhydric pilyalkylene ethers including U.S. Pats. 1,922,459; 3,009,939 and 3,061,625 or by the process disclosed by Wurtz in 1859 and in Encyclopedia of Chemical Technology, vol. 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-toluylene diamine, 4,4'-diphenylmethane diamine, p,p',p''-triphenylmethane triamine, ethylene diamine, propylene diamine, propylene triamine, N,N,N',N'-tetrakis(2-hydroxypropyl) ethylene diamine, diethylene triamine. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Pats. 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 18-octane diol and the like including 1,20-eicosane diol and the like; alkene diols such as, for example, 1-butene-1,4-diol, 1,3-butadiene-1,4-diol , 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexane triol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as for example, 3-heptene-1,2,6,7-tetrols and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 2-hexyne-1,6-dithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diaminopyridene, 2,4-diamino-5-aminomethyl pyrimidine, 2,5-diamino-1,3,4-thiadiazol and the like.

Any of the compounds of any of the classes set forth above may be substituted with halogen such as, for example, chloro, bromo, iodo and the like; nitro; alkoxy such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto carbonyl, thiocarbonyl, phosphoryl, phosphato and the like.

In the production of the polyurethane foams, in addition to the organic polyisocyanate and the active hydrogen containing compound and the blowing agent, it is often advantageous to include other components which aid in making a product having the best physical properties. It is particularly desirable to use a catalyst and a stabilizer. Any suitable catalyst may be used, but as has been proposed heretofore, it is often desirable to have a mixture of a tin compound and a tertiary amine catalyst present. Any suitable tin compound may be used including, for example, stannous chloride, or an organic tin compound. It is preferred to use the organic tin compounds such as the stannous salts or carboxylic acids including stannous oleate, stannous octoate, stannous stearate and the like. But one may also use tetravalent tin compounds including for example dibutyl tin dilaurate, dibutyl tin di-2-ethyl hexoate and the like. Any suitable tertiary amine catalyst may be used and a particularly strong tertiary amine catalyst is triethylene diamine. If weaker catalysts are desired, one may use, for example, N-methyl morpholine, N-ethyl morpholine, diethyl ethanolamine, N-coco morpholine, 1-methyl-4-dimethylamine ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, permethylated diethylene triamine and the like.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Pat. 2,834,748. Where polyhydric polyalkylene ethers are included in the reaction mixture to prepare a cellular polyurethane plastic, it is preferred to employ a silicone oil of the above patent within the scope of the formula:

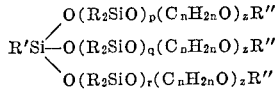

wherein R, R' and R" are alkyl radicals having 1 to 4 carbon atoms; $p$, $q$, and $r$ each have a value of from 4 to 8 $(C_nH_{2n}O)_z$ is a mixed polyoxyethylene oxypropylene group containing from 15 to 19 oxyethylene units and from 11 to 15 oxypropylene units with $z$ equal to from about 26 to about 34. A preferred compound has the formula:

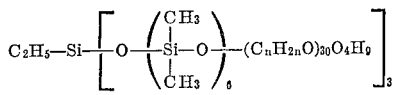

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Pats. 668,478, 668,537 and 670,091. Other suitable compounds may therefore have the formula

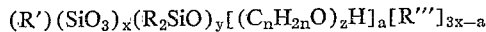

where X is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and the method of determining the chain length of the polysiloxane chains and the polyoxyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula R₃Si– where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

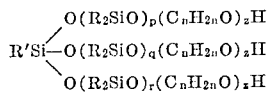

where $p+q+r=y$ of the above formula and has a minimum value of 3, the other subscripts being the same as in the foregoing formula. In this instance, all three of the oxyalkylene chains are joined to the end of polysiloxane chains of the type —(R₂SiO)—. Specifically, one could use [Me₃SiO(Me₂SiO)₅]₂

where Me is methyl.

Another class of stabilizer could be represented by the general formula:

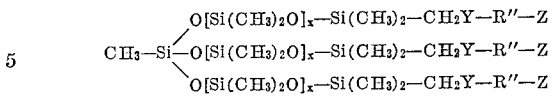

wherein $x$ is from 1 to 150, Y is —NH, —NR', =N—CO—R', =N—CH₂CH₂—Z or O, R' is alkyl or aryl such as methyl, ethyl, propyl, phenyl or the like, R" is an alkylene radical preferably having from 2 to 6 carbon atoms such as ethylene, propylene, isopropylene, butylene, hexylene or the like, and Z is —NH₂, —OH, —NR'₂, —OR' or the like.

Specifically, one could use

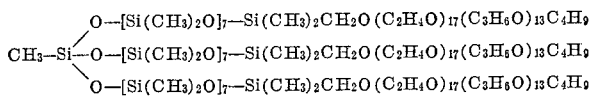

The polyurethane foams of the invention are particularly useful for the preparation of insulation, for example, in refrigerators or in the walls of a dwelling, for example. They may also be used to prepare floats, or for the preparation of decorative articles or cushions, pillows and the like.

The polyurethane foams of the invention are useful for the production of insulation for the walls of dwellings, for example, and in the walls of refrigerators, in addition, they may be used for the preparation of acoustical tile and the like. It is possible to use the polyisocyanates of the invention directly as improved adhesives.

The invention is further illustrated by the following examples in which the parts are by weight unless otherwise indicated.

EXAMPLE 1

About 100 parts of an organic polyisocyanate having the formula:

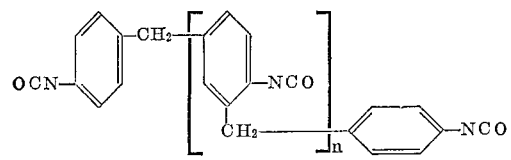

wherein $n$ is about 0.88 and said mixture contains about 45 percent diisocyanate, about 30 percent triisocyanate and about 23 percent tetra- and higher functional isocyanate is mixed with about 0.4 percent of water and heated to a temperature of about 120 to 130° C. for 3⅓ hours. The product is then cooled to 70° C. and filtered to remove a small amount of solids which are formed in the course of the reaction. The resulting product is then analyzed and found to contain about 46 percent difunctional isocyanate, about 5 percent triisocyanate and about 49 percent tetrafunctional and higher polyisocyanate. Furthermore, the product has unusually good clarity. There is no haze present as on storage for weeks which is often present on storage of the unmodified product. The product had about 31.8 percent of isocyanate before reaction with the water and the final product still has about 29.5 percent free isocyanate.

EXAMPLE 2

The isocyanate prepared in Example 1 which contains about 29.5 percent free —NCO groups is used to prepare a polyurethane foam as follows:

About 70 parts of the propylene oxide adduct of sucrose having a hydroxyl number of about 410 is mixed with about 30 parts of diethyl-N,N-bis(2-hydroxyethyl) aminomethyl phosphonate which has a hydroxyl number of about 440 and about 30 parts of trichlorofluoromethane, about 1.5 parts of N,N,N',N'-tetramethylbutane diamine and about 2 parts of a silicone oil having the formula

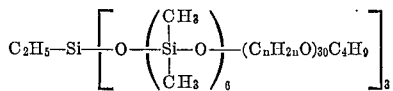

wherein ($C_nH_{2n}O$) is a mixed polyoxyethylene and oxypropylene block copolymer containing about 17 oxyethylene units and about 13 oxypropylene units. This mixture is then mixed with about 114 parts of the isocyanate of Example 1. A polyurethane foam is obtained which has a density of about 2 pounds per cubic foot and which is non-burning according to ASTM test D–1692–59T.

EXAMPLE 3

The isocyanate of Example 1 is used directly as an adhesive for adhering rubber to metal as follows:

A sheet of GRS rubber, 1/8 inch thick is coated on one side with the isocyanate, a sheet of steel about 1/16 inch thick is also coated and the two coated surfaces are pressed together and allowed to stand overnight. The adhesive is very strong and the rubber tears before releasing from the steel panel.

It is to be understood that the foregoing examples are given for the purposes of illustration and that any other suitable amine, ketone, phosgenation procedure, organic polyol or the like could have been used in the examples provided that the disclosure in this application is adhered to.

It is noted that organic polyols which contain at least some chemically combined phosphorus will be used insofar as processes for the preparation of these compounds is sometimes somewhat peculiar. Suitable processes are disclosed in U.S. Pats. 3,099,676; 3,197,629; 3,225,010; and 3,235,517.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. An organic polyisocyanate prepared by a process which comprises reacting a mixture of polyaryl polyalkylene polyisocyanates having the formula:

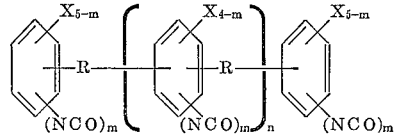

wherein $n$ has an average value of from about 0.1 to 2.0 so that about 20 to 90 percent diisocyanate is present in the initial mixture with about 0.1 percent to about 0.5 percent of water based on the weight of the mixture of isocyanates at a temperature of from about 100° C. to about 140° C. for a period of from about 1 hour to about 5 hours, wherein R is an organic radical obtained by removing the carbonyl oxygen from an aldehyde or ketone, $m$ is 1, X is a member selected from the group consisting of chlorine, bromine, alkyl containing one to four carbon atoms and hydrogen.

2. The organic polyisocyanate of claim 1 wherein said product contains from about 30 percent to about 80 percent diisocyanate.

References Cited

UNITED STATES PATENTS

| | | | |
|---|---|---|---|
| 2,683,730 | 7/1954 | Seeger et al. | 260—453 |
| 3,124,605 | 3/1964 | Wagner | 260—453 |
| 3,294,713 | 12/1966 | Hudson et al. | 260—453 XR |

CHARLES B. PARKER, Primary Examiner

D. H. TORRENCE, Assistant Examiner

U.S. Cl. X.R.

106—122; 252—62; 260—2.5, 570